United States Patent [19]
Wu

[11] Patent Number: 6,022,118
[45] Date of Patent: Feb. 8, 2000

[54] LAMP WITH MOTOR-ROTATED COMPONENT

[76] Inventor: Raymond Wu, 5F, No. 9, Alley 13, Lane 259, Hsin-Yi Rd., Lu-Chou Hsiang, Taipei Hsien, Taiwan

[21] Appl. No.: 09/006,162

[22] Filed: Jan. 13, 1998

[51] Int. Cl.$^7$ ............... F21V 17/00; F21V 3/00
[52] U.S. Cl. ............... 362/35; 362/363; 362/122; 362/324; 362/284
[58] Field of Search ............... 362/35, 806, 351, 362/122, 363, 432, 319, 322, 324, 282, 277, 284

[56] References Cited

U.S. PATENT DOCUMENTS

| | | | |
|---|---|---|---|
| 1,124,336 | 1/1915 | Salzer | 362/35 |
| 2,772,348 | 11/1956 | Moss | 362/282 X |
| 4,736,278 | 4/1988 | Wolens et al. | 362/35 |
| 4,858,079 | 8/1989 | Ohashi | 362/35 |
| 4,996,633 | 2/1991 | Fu | 362/35 |
| 5,324,224 | 6/1994 | Anderson et al. | 362/277 X |
| 5,339,224 | 8/1994 | Woehler | 362/35 |
| 5,442,524 | 8/1995 | Farmer | 362/35 |
| 5,517,388 | 5/1996 | Hutchisson | 362/35 |

*Primary Examiner*—Laura K. Tso
*Attorney, Agent, or Firm*—Smith, Gambrell & Russell, LLP

[57] ABSTRACT

An improved lighting device generally comprises a bottom housing that has a truncate shape. The top surface of the bottom housing is connected with a supporting bracket that has mounted with a covering lid thereof. The bottom surface of the supporting bracket is provided with a mounting barrel that is connected with a motor supporting bracket. The output shaft of the driving motor is meshed with a pinion by means of a driving block. The pinion is firstly passed through the side hole of the supporting bracket, then it can be meshed with a gear of a positioning post that is disposed within a middle hole of the supporting bracket. The gear is rotationally attached to the positioning post by means of a bearing. The top end of the positioning post is projected over the central hole of the covering lid and is connected with the connector of the bulb socket. Consequently, the top surface of the gear is also projected over the central hole of the covering lid and connected further with the connecting socket. A threaded bushing is locked into the connecting socket and the bulb socket can be therefore covered. The top surface of the connecting socket can be connected with a plurality of shades. The bottom housing can be connected onto a supporting stand. The bottom housing can be also attached to the wall surface, or desktop, or ceiling.

11 Claims, 7 Drawing Sheets

LAMP WITH MOTOR-ROTATED COMPONENT

FIELD OF THE INVENTION

The present invention relates to a rotational lighting device, more particularly, to an improved rotational lighting device in which the bulb is disposed stationary while the housing is rotated by a driven device.

FIELD OF THE INVENTION

In the conventional illumination device, the bulb or shade is fixedly disposed without the possibility of rotating with respect to each other. Only in one or two type of illumination device, the shade is rotated by airflow. Even there is some rotational illumination device, the bulb and the shade are rotated by a driving device simultaneously. And this illumination device is intended for special application.

SUMMARY OF THE INVENTION

It is the objective of this invention to provide a rotational lighting device in which the shade can be readily rotated with respect to the bulb. This rotational lighting device can be readily disposed on the desktop, ceiling and wall. Accordingly, a rotational illumination device can be attained.

According to one aspect of the present invention, a driving device is enclosed by the bottom housing and covering lid. The light socket and the driving device are held stationary while the shade of the bulb can be rotated as it is driven by the driving device.

In order to achieve the objective set forth, the improved lighting device made according to the present invention generally comprises a bottom housing that has a truncate shape. The top surface of the bottom housing is connected with a supporting bracket that has mounted with a covering lid thereof. The bottom surface of the supporting bracket is provided with a mounting barrel that is connected with a motor supporting bracket. The output shaft of the driving motor is meshed with a pinion by means of a driving block. The pinion is firstly passed through the side hole of the supporting bracket, then it can be meshed with a gear of a positioning post that is disposed within a middle hole of the supporting bracket. The gear is rotationally attached to the positioning post by means of a bearing. The top end of the positioning post is projected over the central hole of the covering lid and is connected with the connector of the bulb socket. Consequently, the top surface of the gear is also projected over the central hole of the covering lid and connected further with the connecting socket. A threaded bushing is locked into the connecting socket and the bulb socket can be therefore covered. The top surface of the connecting socket can be connected with a plurality of shades. The bottom housing can be connected onto a supporting stand.

BRIEF DESCRIPTION OF THE DRAWINGS

In order that the present invention may more readily be understood the following description is given, merely by way of example with reference to the accompanying drawings, in which.

DETAILED DESCRIPTION OF PREFERRED EMBODIMENT

Figure 1:
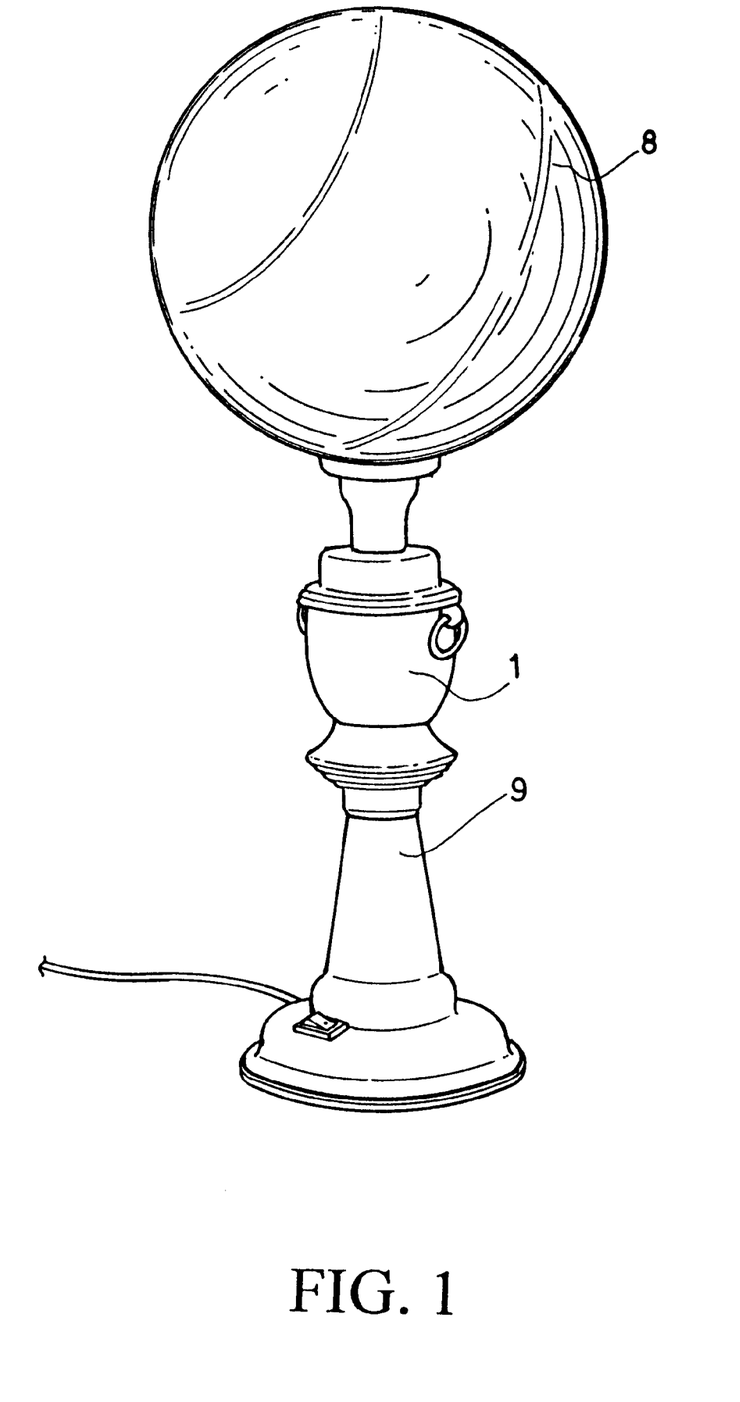
FIG. 1 is a perspective view of the lighting device made according to the present invention.
Figure 2:
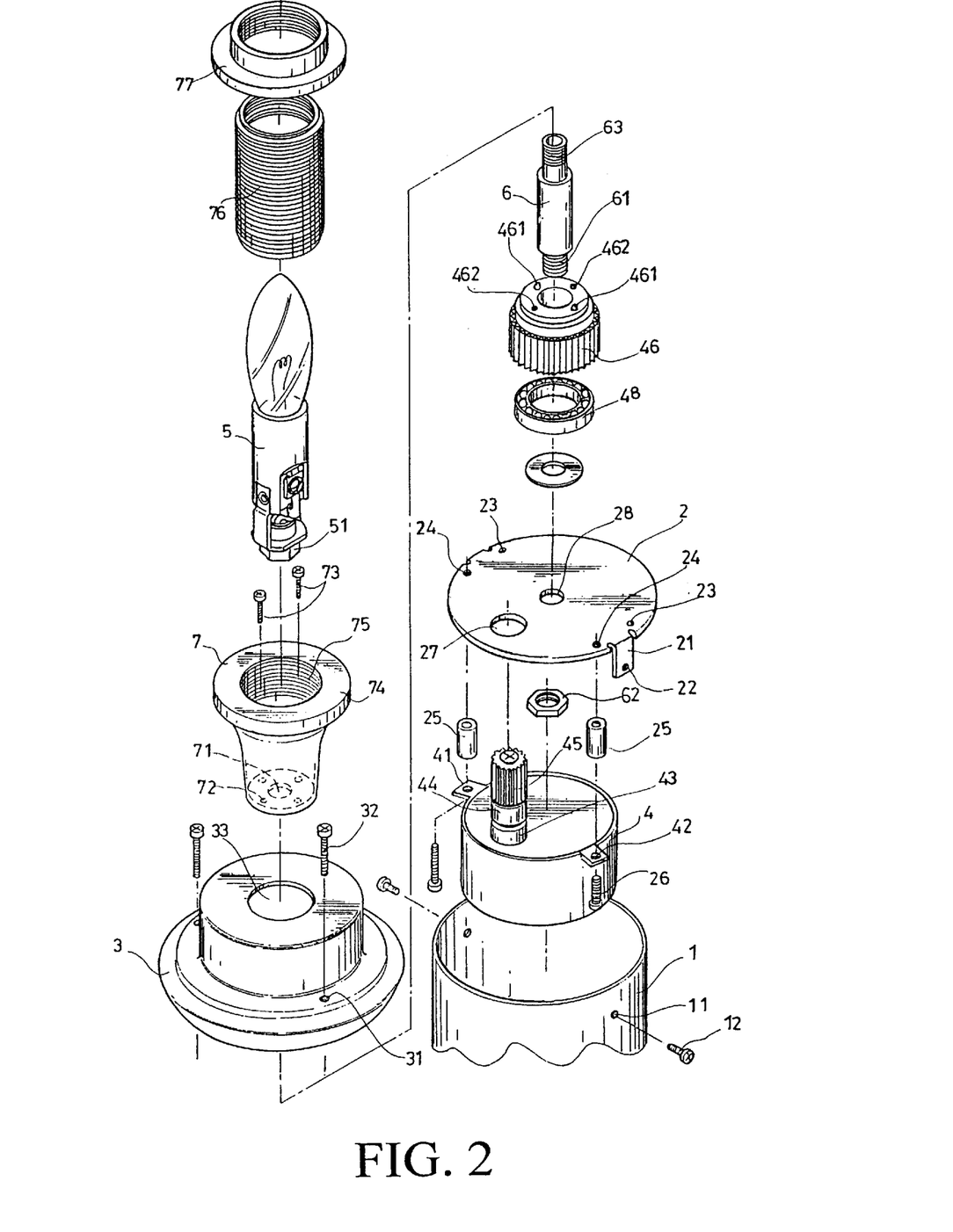
FIG. 2 is an exploded view of the light device shown in FIG. 1.
Figure 3:
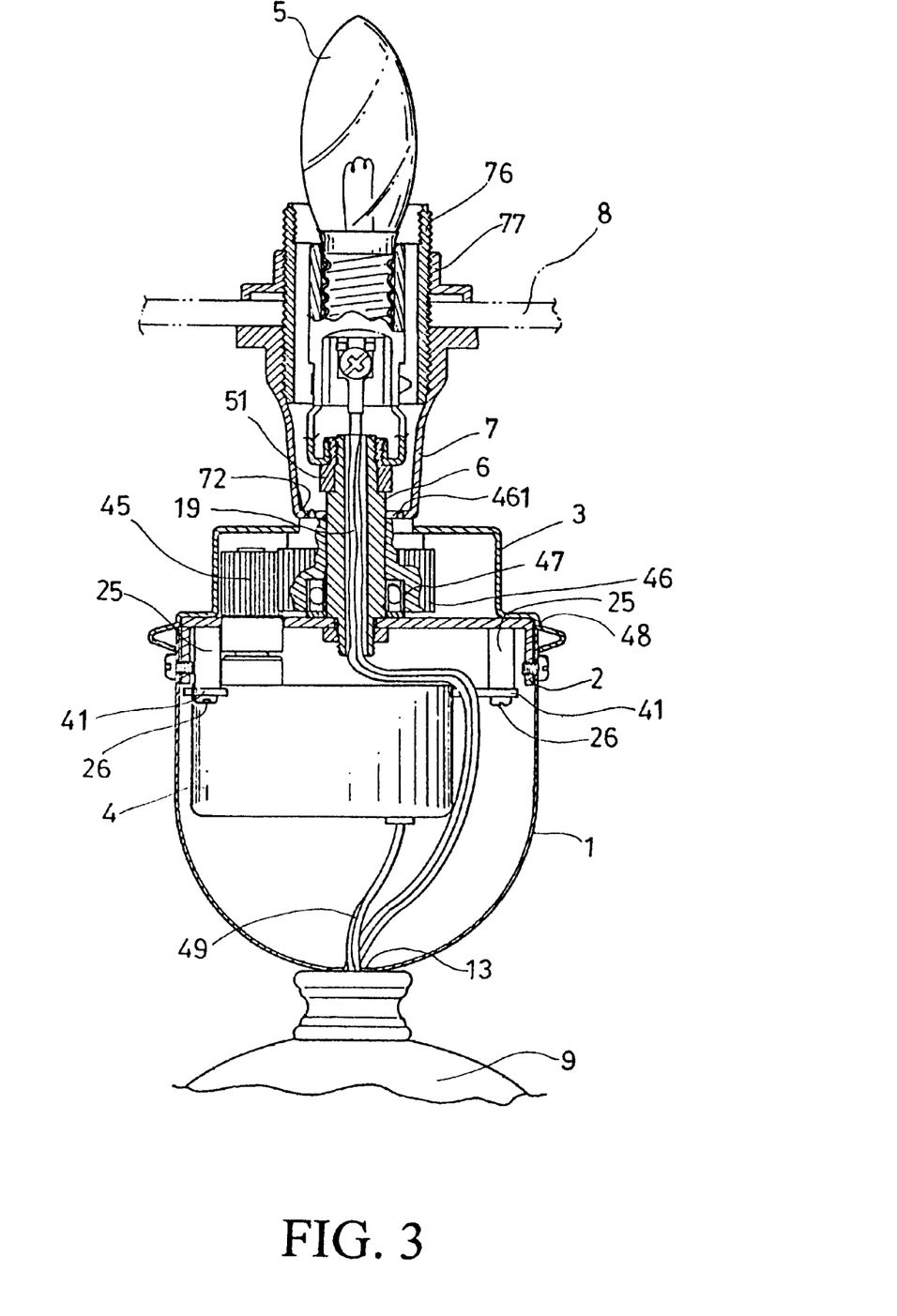
FIG. 3 is a cross sectional view of the light device shown in FIG. 1.

Referring to FIGS. 1 to 3, the lighting device made according to the present invention generally comprises a bottom housing 1 that has truncate shape. The top surface of the bottom housing 1 is connected with a supporting bracket 2. The bottom housing 1 is provided with a through hole 11 at both sides respectively. A locking screw 12 can be locked into the threaded hole 22 of the lug 21 of the supporting bracket 2. The lug 21 is bent downward from both sides. The top surface of the supporting bracket 2 is also provided with a pair of threaded holes 23. A covering lid 3 having a through hole 31 can be fixedly attached to the top surface of the supporting bracket 2 by means of a locking screw 32. By this arrangement, the bottom housing 1 can be also covered by the covering lid 3. The bottom surface of the supporting bracket 2 includes another pair of threaded holes 24 in which a long locking screw 26 can be firstly inserted into the through hole 42 of the mounting bracket 41 of the driving motor 4, then the long locking screw 26 can engage with a threaded hole 24 after it passes through a bushing 25. Accordingly, the driving motor 4 is supported above the bottom surface of the supporting bracket. The output shaft of the driving motor 4 is meshed with a pinion 45 by means of a driving block 44. The pinion 45 is firstly passed through the side hole 27 of the supporting bracket 2, then it can be meshed with a gear 46 of a positioning post 6 that is disposed within a middle hole 28 of the supporting bracket 2. The gear 46 is rotationally attached to the positioning post 6 by means of a bearing 48. By this arrangement, the gear 46 can be readily rotated with respect to the positioning post 6. The middle groove 47 of the gear 46 that is rotationally attached on the positioning post 6 is further disposed with a bearing 48 to ensure the smooth rotation of the gear 46. As a result, a noiseless and smooth rotation can be attained. Besides, the service life is also increased.

On the other hand, as the driving motor 4 is disposed above the bottom surface of the supporting bracket 2 by means of the mounting barrel 25, the conducting wires 19 that is routed through the positioning post 6 will not be entangled by the driving motor 4. As a result, the power lines 49 of the driving motor 4 and the conducting wires 19 of the lighting device can be readily routed out through the through hole 13 of the bottom housing 1. By this arrangement, the driving motor 4 can be disposed closer to the central position of the positioning post. Consequently, the total area of the bottom housing 1 can be suitably reduced. As a result, the flexibility of the lighting device is more adaptable and the transmission of the motor is more efficient.

The bottom end of the positioning post 6 has a threaded portion 61 and that is firstly inserted into the central hole of the supporting bracket and then locked up by means of a locking nut 62. The top end 63 of the positioning post 6 is firstly passed through the central hole 33 of the covering lid 3 and then is connected to the connector 51 of the bulb socket 5. In general, the top end is an external threaded portion and the connecting socket is a nut. As a result, the bulb socket can be readily locked by those two elements. The conducting wires 19 are passed through the central hole 71 of the connecting socket 7 and then are electrically connected to the contacts of the bulb socket. The top surface of the gear 46 is also projected over the central hole 33 of the covering lid 3 and then is connected with the bottom surface of the connecting socket 7. The top surface of the gear 46 is provided with a pair of projections 461 and a pair of recesses 462. The connecting socket 7 has a wider top and a narrow bottom. The bottom surface includes four holes 72 and wherein the projections 461 can be disposed therein. Each of the recesses 462 can receive a locking screw 73 therein. The connecting socket, pinion and gear can be made from plastic material to reduce the cost and overall weight. The top end of the connecting socket 7 is locked with a threaded bushing 76 by means of an inner threaded portion 75. Accordingly, the bulb socket 5 can be readily covered and protected. The top surface 74 of the connecting socket 7 can receive a bottom surface of a ball-shape shade 8. Of course, other suitable shade can be also disposed therein. Then a locking nut 77 can be engaged with the threaded bushing 76 to fix the shade 8 thereof. On the other hand, the bottom housing can be also connected to the supporting stand 9. In an alternative, the bottom housing 1 can be also mounted directly onto the wall or ceiling. The bottom housing 1 can be directly disposed onto the floor also.

Figure 4:
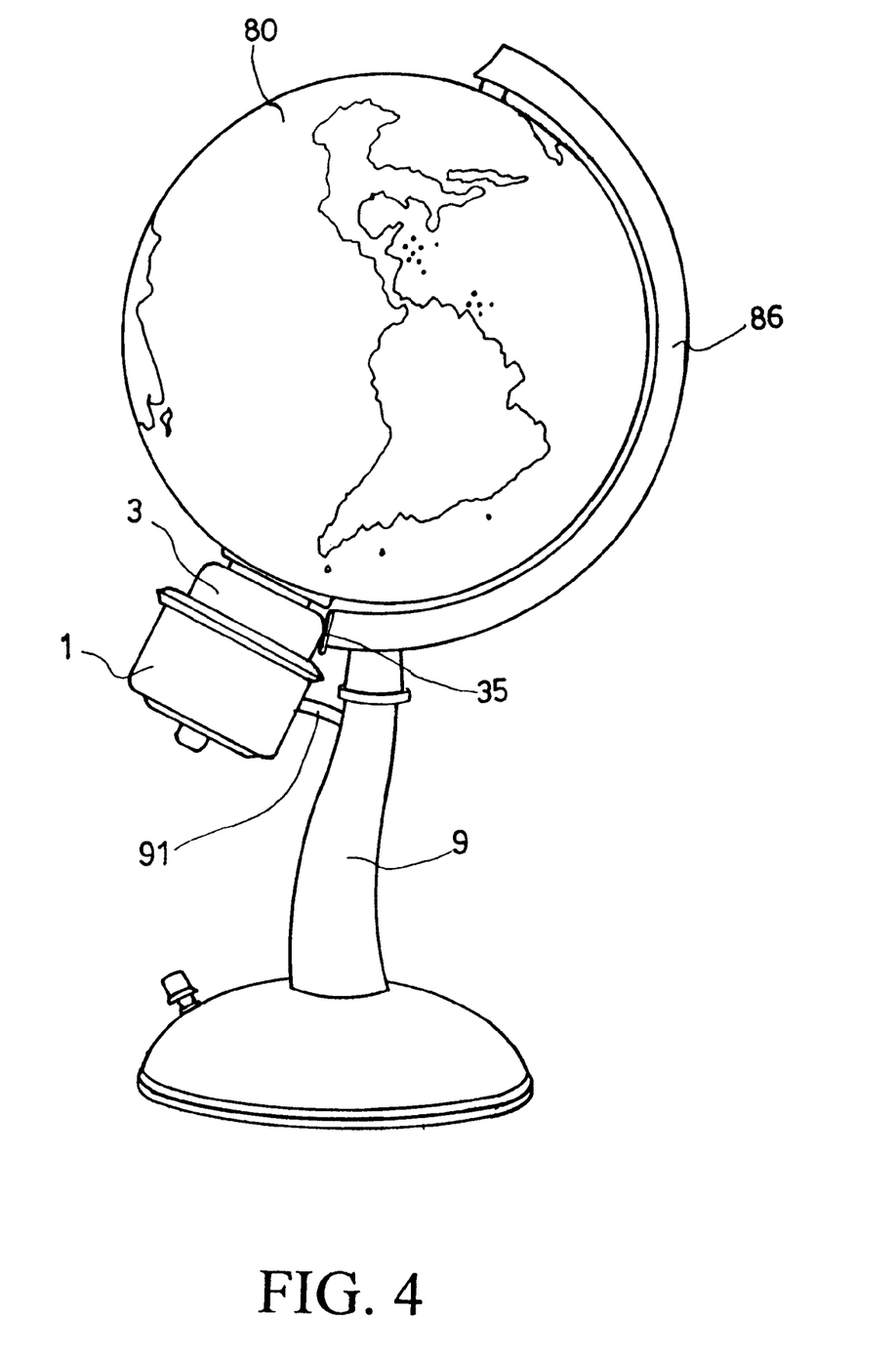
FIG. 4 is a second embodiment of the lighting device made according to the present invention.
Figure 5:
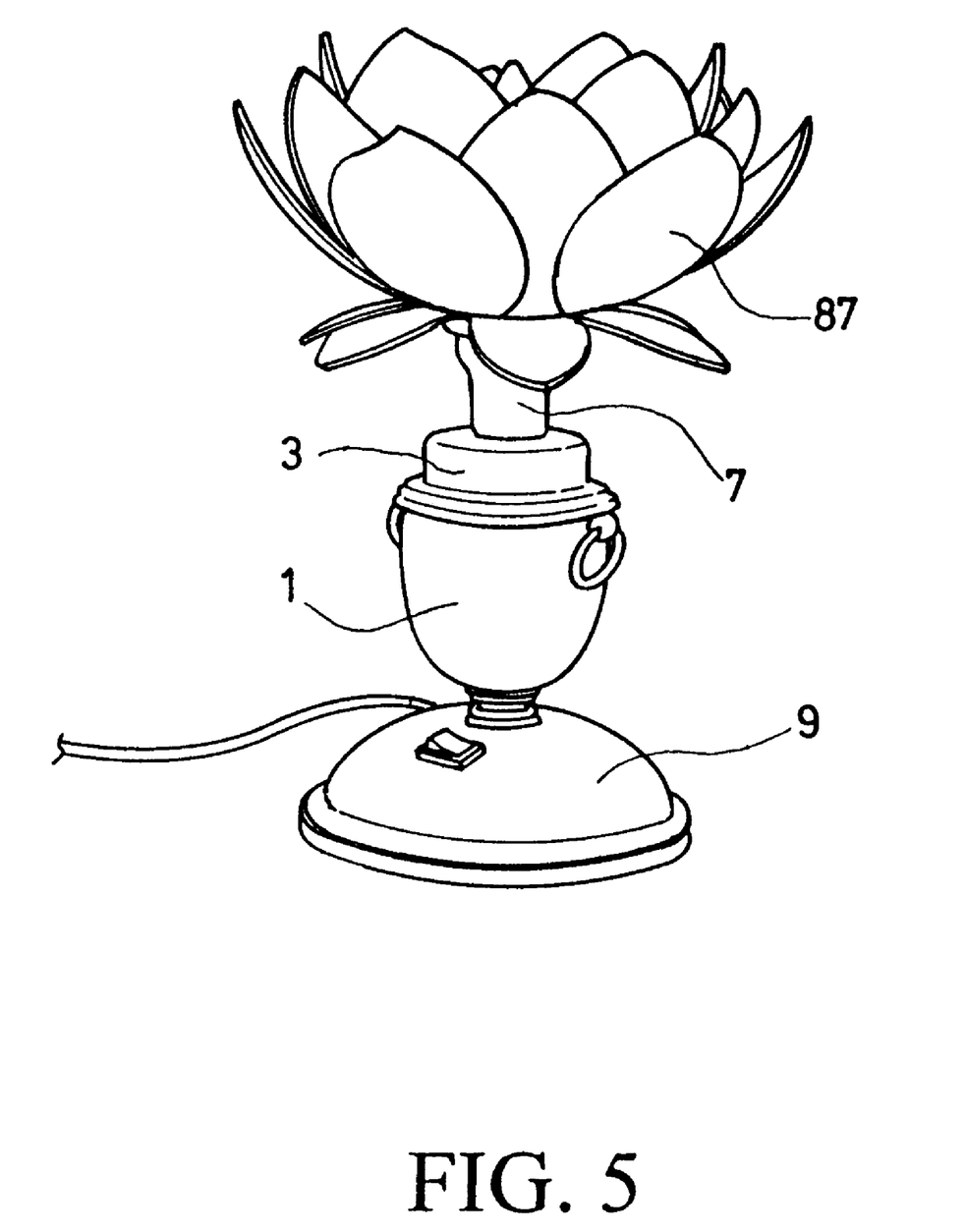
FIG. 5 is a third embodiment of the lighting device made according to the present invention.

In FIG. 1, the lighting device is embodied in a ball-shape light. In an alternative, the light device can be embodied into a globe-shape light. As a result, as the map is imprinted onto the shade and when the bulb is lit on, the light emitted from the bulb will illuminate the whole map. On the other hand, as the shade/globe can be rotated, the overall atmosphere resulted therefrom will quite different. In this case, the bottom housing 1 is arranged in an inclined manner. The bottom housing 1 and the covering lid 3 are directed toward the supporting stand 9 and is held by a shading plate 35 and the side post 91. Since the globe has a large dimension. A half post 86 of the supporting stand 9 is pivotally attached to the North Pole of the globe 80. The South Pole of the globe 80 is supported onto the top surface 74 of the connecting socket 7. On the other hand, the motor can be controlled to rotate clockwise or counterclockwise. The illumination of the bulb can be also controlled by a switch. In FIG. 5, the shade can be replaced by the petals 87. In this embodiment, the bottom housing is directly supported onto the supporting stand 9.

Figure 6:
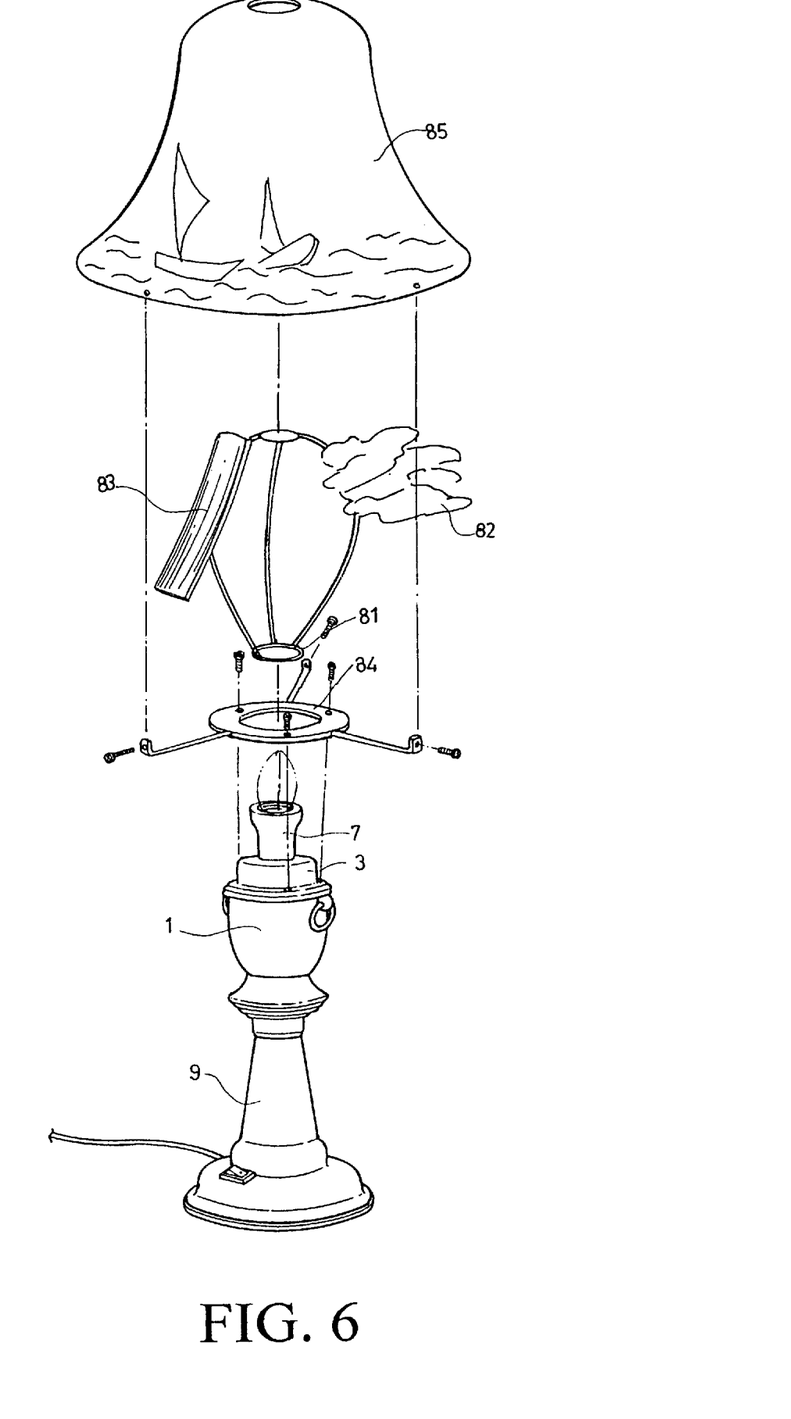
FIG. 6 is an exploded view of a fourth embodiment of the lighting device made according to the present invention.
Figure 7:
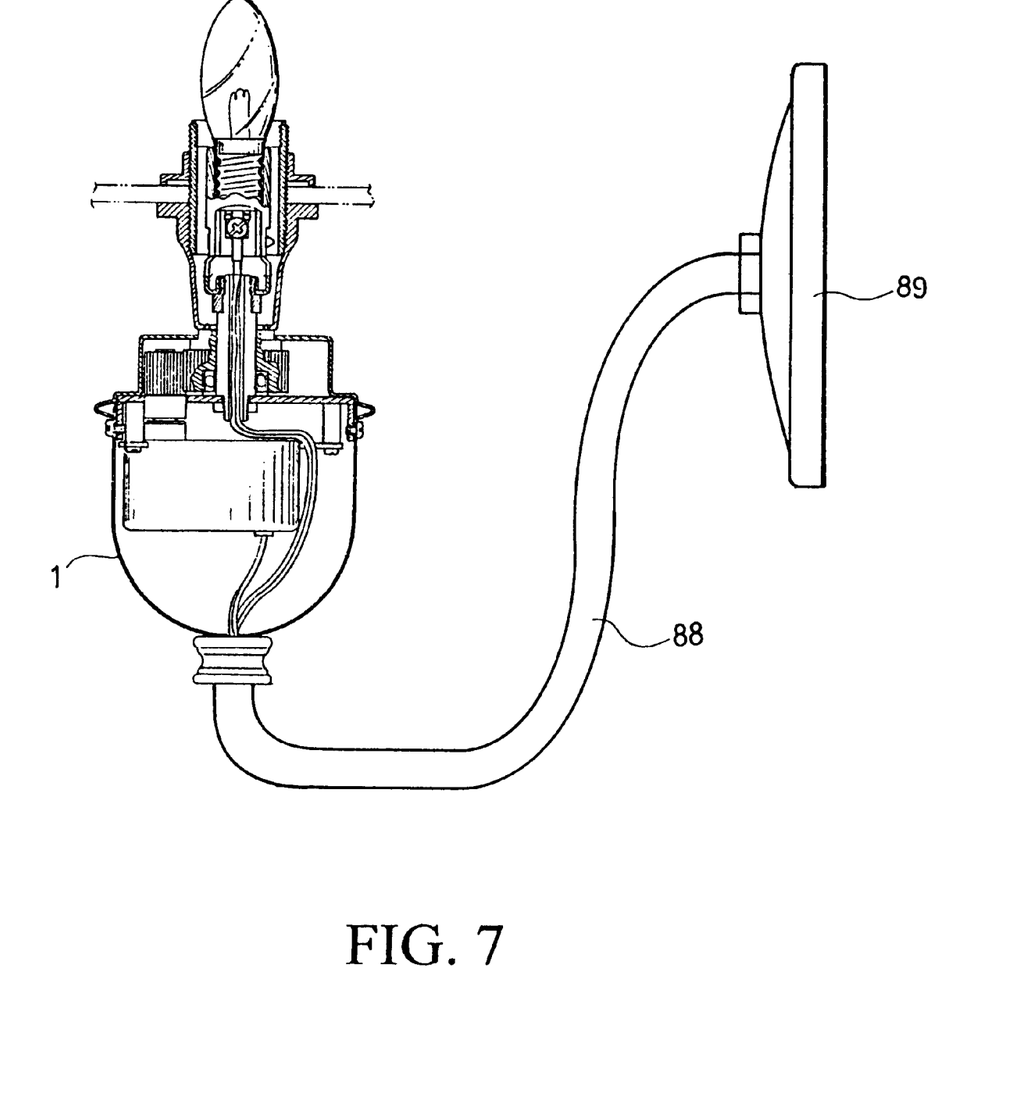
FIG. 7 is an exploded view of a fifth embodiment of the lighting device made according to the present invention.

In FIG. 6, the connecting socket 7 is enveloped with a supporting bracket 81 that includes a transparent plate 82 having imprinted clouds thereof at one side. The other side includes a dark plate 83. A three-leg bracket 84 is fixedly attached to the covering lid 3 and an observing shade 85 is disposed onto the three-leg bracket 84. The observing shade 85 is imprinted with patterns. Accordingly, when the bracket is rotated by the connecting socket, the clouds and bright/dark phenomena can be attained. However, the embodiment of the present invention is not limited the above described. A plurality of different embodiment can be readily made within the scope of the present invention. In FIG. 7, the lighting device made according to the present invention is embodied into a wall light. The through hole 13 of the bottom housing 1 is connected onto an elbow 88 firstly, then it is attached to the wall stand 89.

The main feature of the present invention is by the driving mechanism that is disposed within the bottom housing, the shade of the lighting device can be readily rotated and the shade can be designed into different shape to attain different result. On the other hand, the bottom housing can be readily and conveniently disposed on the desktop, wall surface, ceiling and floor to achieve different intended lighting purposes, for example, a brand new globe can be readily attained.

While particular embodiment of the present invention has been illustrated and described, it would be obvious to those skilled in the art that various other changes and modifications can be made without departing from the spirit and scope of the invention. It is therefore intended to cover in the appended claims all such changes and modifications that are within the scope of the present invention.

I claim:

1. An improved rotational lighting device comprising a bottom housing which has a through hole the top surface of said bottom housing being connected with a pair of lugs of a supporting bracket, a covering lid which covers the supporting bracket, the bottom surface of said supporting bracket being connected with a motor supporting bracket, a driving motor having an output shaft connected to a pinion, said pinion being firstly passed through a side hole of said supporting bracket and then being meshed with a gear of a positioning post that is disposed within a middle hole of the supporting bracket, said gear being rotationally attached to said positioning post by means of a bearing, the top end of said positioning post projecting through said covering lid and being connected with a connector of a bulb socket, a connecting socket connected to the top surface of said gear, the top surface of said connecting socket being connected with a rotated member, wherein power lines are routed into said bottom housing via a through hole thereof and then is directed to said bulb socket or driving motor such that said pinion and said gear can be driven to rotate said connecting socket and said rotated member.

2. An improved rotational lighting device as recited in claim 1, wherein said connecting socket of said bulb socket is connected to a threaded bushing to shade said bulb socket.

3. An improved rotational lighting device as recited in claim 2, wherein said rotated member is a shade which has a pedal shape and that is fixedly attached to said threaded bushing by means of a locking nut.

4. An improved rotational lighting device as recited in claim 1, wherein said rotated member is a shade which has a ball shape.

5. An improved rotational lighting device as recited in claim 1, wherein said bottom housing is fixedly attached to a supporting stand.

6. An improved rotational lighting device as recited in claim 1, wherein said bottom housing can be directly disposed onto at least one of a desktop, a ceiling, a wall surface and a floor.

7. An improved rotational lighting device as recited in claim 1, wherein said bottom housing can be attached to a supporting stand in an slant manner.

8. An improved rotational lighting device as recited in claim 7, wherein said rotated member is a shade which has a ball-shape and the outer surface of said ball shade is imprinted with maps and serves a globe, wherein the North Pole of said globe is pivotally attached to a half post of said supporting stand, and the South Pole of said globe is pivotally attached to the top surface of said supporting stand.

9. An improved rotational lighting device as recited in claim 1, wherein said rotated member is a second supporting bracket which is attached to the top surface of said connecting socket, the side portions of said supporting bracket having colorful plates attached thereto, a three-leg bracket fixedly attached to said covering lid, an observing shade attached to said three-leg bracket, said observing shade being imprinted with patterns, wherein when said supporting bracket is rotated by said connecting socket, a changing view can be seen.

10. An improved rotational lighting device as recited in claim 1, wherein said driving motor can be rotated clockwise and counterclockwise.

11. An improved rotational lighting device as recited in claim 1, wherein said bottom housing can be attached to an elbow via a through hole, the other end of said elbow can be attached to the wall surface.

* * * * *